(12) United States Patent
Zhang et al.

(10) Patent No.: US 11,442,509 B2
(45) Date of Patent: Sep. 13, 2022

(54) ROTATING SHAFT AND ELECTRONIC DEVICE

(71) Applicant: Lenovo (Beijing) Co., Ltd., Beijing (CN)

(72) Inventors: Ran Zhang, Beijing (CN); Jinzhong Shi, Beijing (CN); Liang Han, Beijing (CN); Tianshui Tan, Beijing (CN); Shibo Rui, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 32 days.

(21) Appl. No.: 17/033,209

(22) Filed: Sep. 25, 2020

(65) Prior Publication Data
US 2021/0096612 A1 Apr. 1, 2021

(30) Foreign Application Priority Data
Sep. 26, 2019 (CN) .......................... 201910922066.9

(51) Int. Cl.
G06F 1/16 (2006.01)
E05D 3/12 (2006.01)

(52) U.S. Cl.
CPC ............. *G06F 1/1681* (2013.01); *E05D 3/12* (2013.01); *E05Y 2900/606* (2013.01)

(58) Field of Classification Search
CPC .... G06F 1/1681; E05D 3/12; E05Y 2900/606
See application file for complete search history.

(56) References Cited

U.S. PATENT DOCUMENTS

| | | | |
|---|---|---|---|
| 10,352,354 B1 * | 7/2019 | Hsu | G06F 1/1652 |
| 11,174,925 B2 * | 11/2021 | Hsu | G06F 1/1681 |
| 2015/0173218 A1 * | 6/2015 | Hsu | G06F 1/1618 |
| | | | 16/366 |
| 2016/0123054 A1 * | 5/2016 | Senatori | E05D 3/18 |
| | | | 361/679.27 |
| 2018/0329462 A1 * | 11/2018 | Larsen | G06F 1/1681 |
| 2021/0018960 A1 * | 1/2021 | Kato | G06F 1/1681 |

(Continued)

FOREIGN PATENT DOCUMENTS

| | | |
|---|---|---|
| CN | 203685839 U | 7/2014 |
| CN | 104791370 A | 7/2015 |

(Continued)

*Primary Examiner* — Victor D Batson
*Assistant Examiner* — Matthew J Sullivan
(74) *Attorney, Agent, or Firm* — Anova Law Group, PLLC

(57) ABSTRACT

A rotating shaft configured to connect two screen-brackets includes two axle structures arranged symmetrically. One of the two axle structures includes an axle, a motion conversion structure, a screen bracket connection structure, and a supporting bracket. The axle includes a worm groove at a surface of the axle. The motion conversion structure cooperates with the worm groove to form a worm drive. The screen bracket connection structure is movably connected to the motion conversion structure and includes mounting holes, which are configured to mount the screen-brackets. The supporting bracket is sleeved at the axle, rotates around an axis of the axle, and is movably connected to the motion conversion structure and the screen bracket connection structure. The motion conversion structure is movable along an axis direction of the axle on a first surface relative to the supporting bracket.

13 Claims, 12 Drawing Sheets

(56) References Cited

U.S. PATENT DOCUMENTS

| | | | | |
|---|---|---|---|---|
| 2021/0208641 A1* | 7/2021 | Huang | .................. | G06F 1/1681 |
| 2021/0293269 A1* | 9/2021 | Yaginuma | ............ | A45C 13/005 |
| 2021/0355725 A1* | 11/2021 | Hsu | ....................... | E05D 11/082 |
| 2021/0381289 A1* | 12/2021 | Hsu | ....................... | G06F 1/1681 |

FOREIGN PATENT DOCUMENTS

| | | |
|---|---|---|
| CN | 109872630 A | 6/2019 |
| CN | 109992054 A | 7/2019 |
| WO | 2008049382 A1 | 5/2008 |

* cited by examiner

ROTATING SHAFT AND ELECTRONIC DEVICE

CROSS-REFERENCE TO RELATED APPLICATION

This application claims priority to Chinese Patent Application No. 201910922066.9, filed on Sep. 26, 2019, the entire content of which is incorporated herein by reference.

TECHNICAL FIELD

The present disclosure relates to a rotating shaft and an electronic device.

BACKGROUND

For a full-screen electronic device, ultra-narrow bezel and folding form are highly desirable. However, for the electronic device configured to fold a screen inward, when the electronic device is in an unfolded state, a rotating shaft is higher than the screen. Therefore, a screen design needs to avoid the rotating shaft, so that the ultra-narrow bezel cannot be achieved. This causes poor user experience. Thus, the electronic device with the ultra-narrow bezel may only have the folding form with the screen facing outward. However, when the screen is folded outward, the screen may not be protected. As such, the rotating shaft design has a major limitation, which makes it difficult for the full-screen electronic device to realize the inward folding form, the ultra-narrow bezel, and the unexposed rotating shaft at the same time.

SUMMARY

Embodiments of the present disclosure provide a rotating shaft configured to connect two screen-brackets including two axle structures arranged symmetrically. One of the two axle structures includes an axle, a motion conversion structure, a screen bracket connection structure, and a supporting bracket. The axle includes a worm groove at a surface of the axle. The motion conversion structure cooperates with the worm groove to form a worm drive. The screen bracket connection structure is movably connected to the motion conversion structure and includes mounting holes, which are configured to mount the screen-brackets. The supporting bracket is sleeved at the axle, rotates around an axis of the axle, and is movably connected to the motion conversion structure and the screen bracket connection structure. The motion conversion structure is movable along an axis direction of the axle on a first surface relative to the supporting bracket. The screen bracket connection structure is movable along a radial direction of the axle on the first surface relative to the supporting bracket. The first surface is a surface where the supporting bracket is located.

Embodiments of the present disclosure provide an electronic device, including two screen-brackets and a rotating shaft. The rotating shaft is configured to connect the two screen-brackets and includes two axle structures arranged symmetrically. One of the two axle structures includes an axle, a motion conversion structure, a screen bracket connection structure, and a supporting bracket. The axle includes a worm groove at a surface of the axle. The motion conversion structure cooperates with the worm groove to form a worm drive. The screen bracket connection structure is movably connected to the motion conversion structure and includes mounting holes, which are configured to mount the screen-brackets. The supporting bracket is sleeved at the axle, rotates around an axis of the axle, and is movably connected to the motion conversion structure and the screen bracket connection structure. The motion conversion structure is movable along an axis direction of the axle on a first surface relative to the supporting bracket. The screen bracket connection structure is movable along a radial direction of the axle on the first surface relative to the supporting bracket. The first surface is a surface where the supporting bracket is located.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION OF THE EMBODIMENTS

Embodiments of the present disclosure are described with reference to accompanying drawings. The description is merely exemplary and does not limit the scope of the present disclosure. In the following description, many details are provided to comprehensively understand embodiments of the present disclosure. However, one or more embodiments may be implemented without these details. In addition, in the following description, well-known structure and technology are omitted to avoid unnecessarily obscuring the concept of the present disclosure.

The terms used here are only for describing specific embodiments and are not intended to limit the present disclosure. The terms "including," "containing," etc., used herein indicate the existence of the described features, steps, operations, and/or components, but do not exclude the existence or addition of one or more other features, steps, operations, or components.

All terms (including technical and scientific terms) used herein have the meanings commonly understood by those skilled in the art unless otherwise specified. The terms used herein should be interpreted as having meanings consistent with the context of the present disclosure and should not be interpreted in an idealized or overly rigid manner.

An expression similar to "at least one of A, B, and C" should be interpreted according to the meaning of the expression commonly understood by those skilled in the art (for example, "a system including at least one of A, B, and C" should include but is not limited to a system including A alone, a system including B alone, a system including C alone, a system including A and B, a system including A and C, a system including B and C, and/or a system including A, B, and C). An expression similar to "at least one of A, B, or C" should be interpreted according to the meaning of the expression commonly understood by those skilled in the art (for example, "a system including at least one of A, B, or C" should include but is not limited to a system including A alone, a system including B alone, a system including C alone, a system including A and B, a system including A and C, a system including B and C, and/or a system including A, B, and C).

In the context of the present disclosure, when a component is referred to as being located "on"/connected to another component, the component may be directly located on/connected to the other component, or there may be other parts between them. In addition, if a part is located "on" another part in one orientation when the orientation is reversed, the part can be located "under" the other part. When a component is referred to as being located "between" two other components, the component may be directly located between the other two components, or there may be other components besides the component between the other two components.

Figures 1A, 1B:
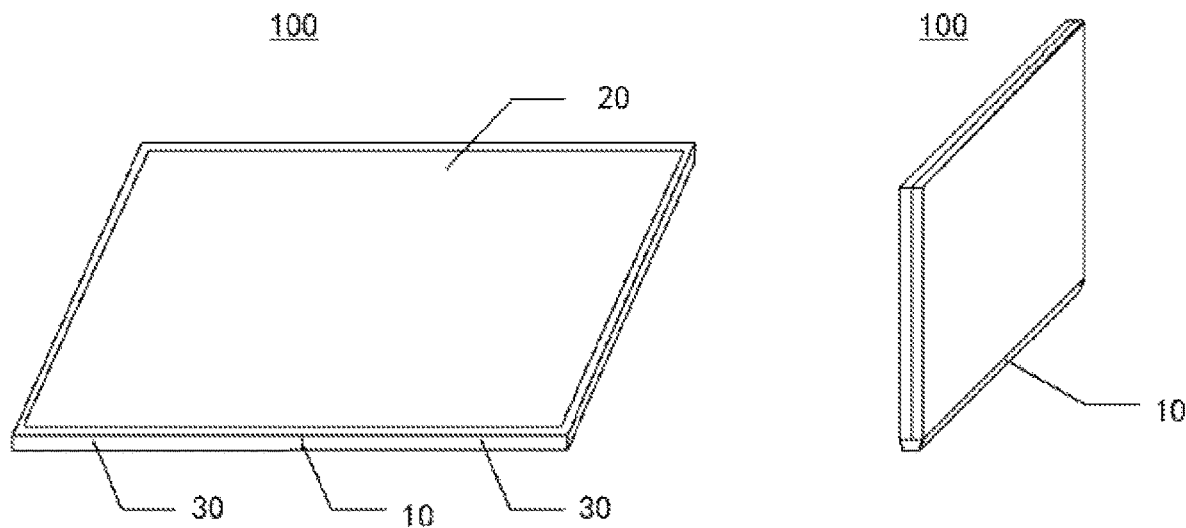
FIGS. 1A and 1B illustrate schematic diagrams of an electronic device according to some embodiments of the present disclosure.

FIGS. 1A and 1B illustrate schematic diagrams of an electronic device 100 according to some embodiments of the present disclosure.

As shown in FIGS. 1A and 1B, the electronic device 100 includes a rotating shaft 10, a flexible screen 20, and two screen-brackets 30. The two screen-brackets 30 are symmetrically connected to both sides of the rotating shaft 10. The flexible screen 20 is mounted at the two screen-brackets 30.

The electronic device 100 may be folded around the rotating shaft 10. For example, as shown in FIG. 1B, the two screen-brackets 30 of the electronic device 100 may rotate toward each other around the rotating shaft 10 to drive the flexible screen 20 to fold inward along the rotating shaft 10.

In the electronic device 100, the rotating shaft 10 may be fully covered by the flexible screen 20. As such, the rotating shaft 10 can be kept hidden and not exposed no matter in a state shown in FIG. 1A or FIG. 1B. In addition, the flexible screen 20 may also cover at least a portion of the two screen-brackets 30 at the same time. In some embodiments, as shown in FIG. 1A, the electronic device 100 may include a laptop computer having the flexible screen 20 with an edge as an ultra-narrow bezel.

An application scenario in FIGS. 1A and 1B is merely exemplary. Besides the laptop computer, the electronic device may also include other electronic devices, such as various cell phones, tablets, electronic dictionaries, game consoles, learning machines, various medical devices, etc.

Figure 2:
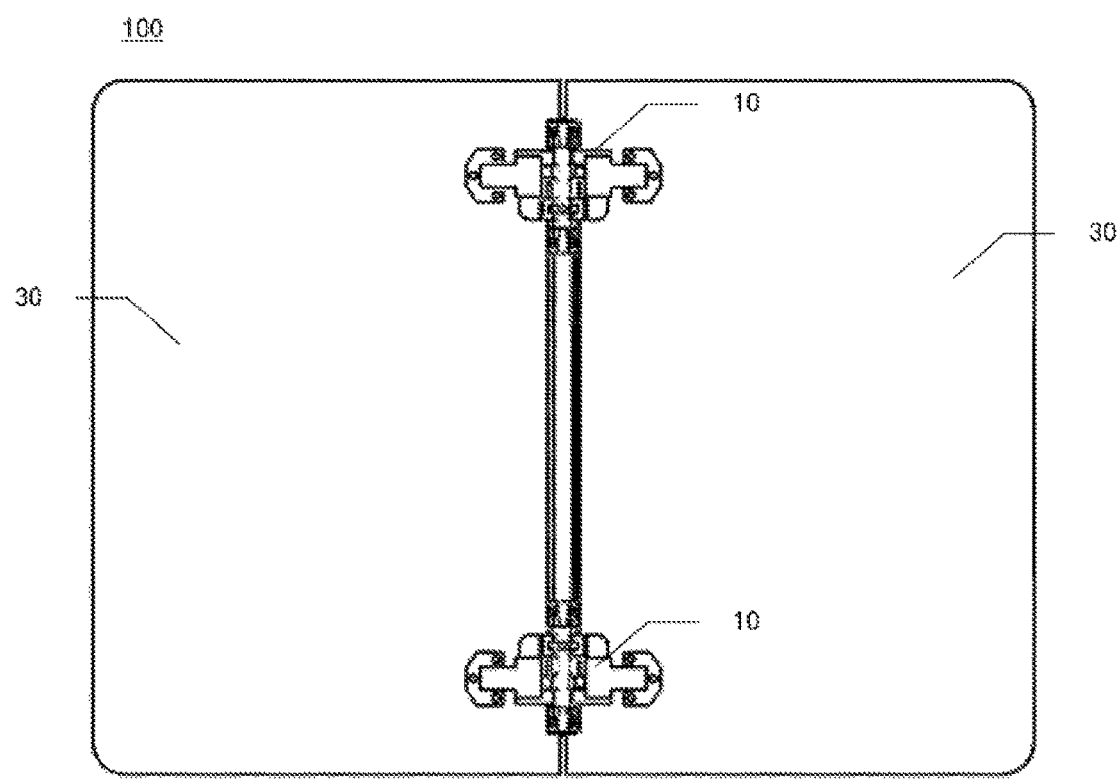
FIG. 2 illustrates a schematic structural diagram of a portion of the electronic device according to some embodiments of the present disclosure.

FIG. 2 illustrates a schematic structural diagram showing a portion of the electronic device 100 according to some embodiments of the present disclosure. FIG. 2 shows a schematic structural view of the electronic device 100 with the flexible screen 20 removed.

Figure 3:
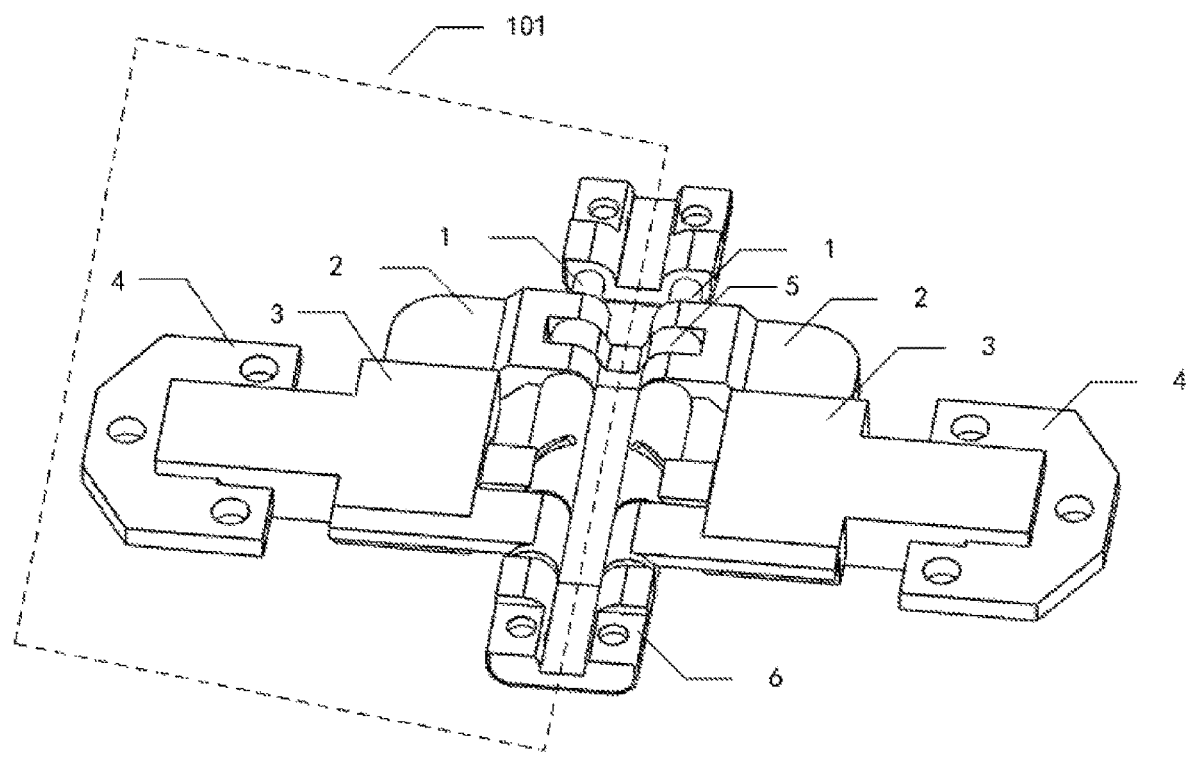
FIG. 3 illustrates a schematic perspective view of a rotating shaft according to some embodiments of the present disclosure.
Figure 4A:
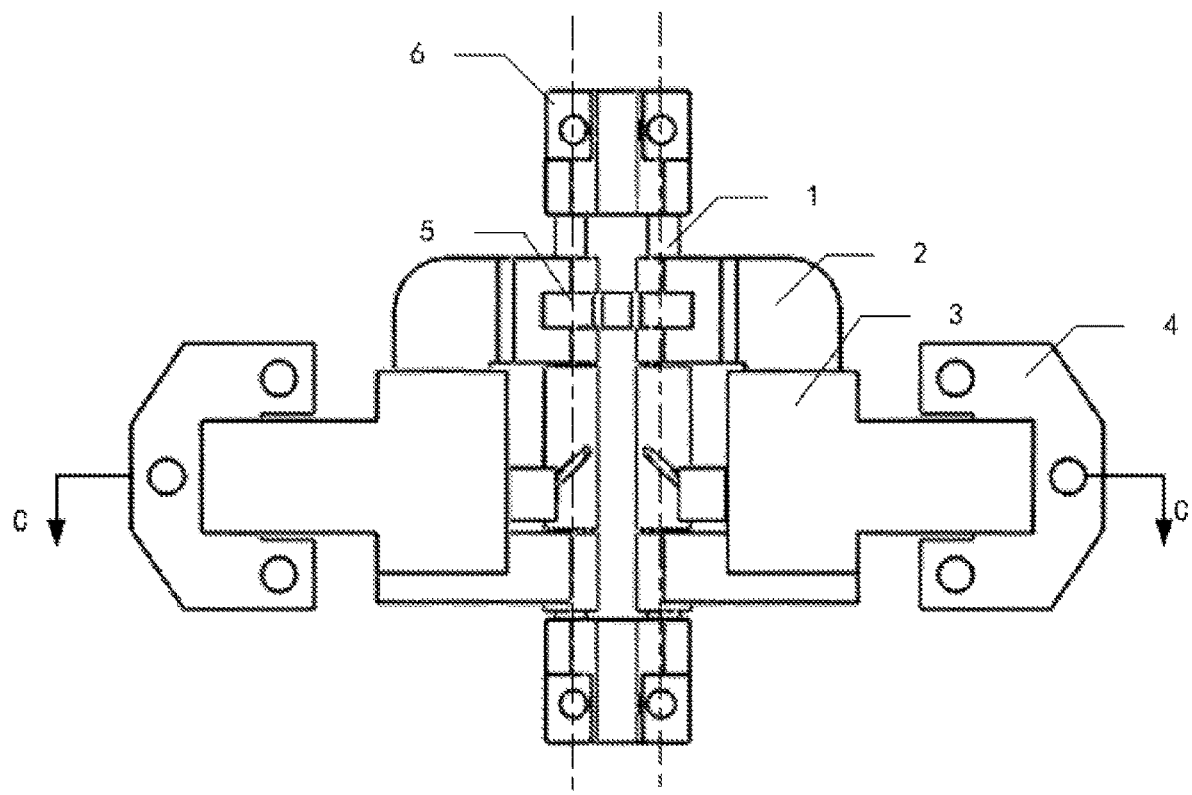
FIG. 4A illustrates a schematic top view of the rotating shaft shown in FIG. 3.
Figure 4B:
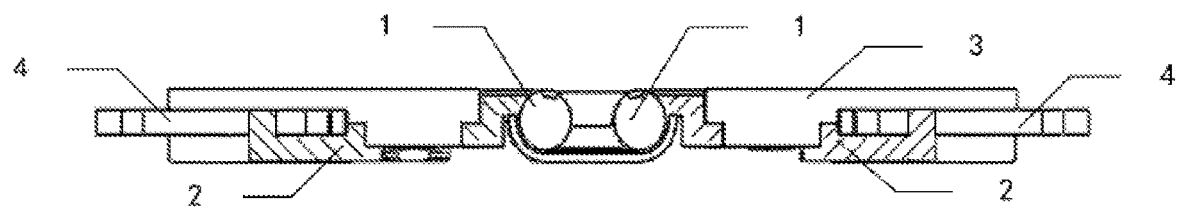
FIG. 4B illustrates a schematic C-C cross-sectional view of the rotating shaft in FIG. 4A.
Figure 4C:
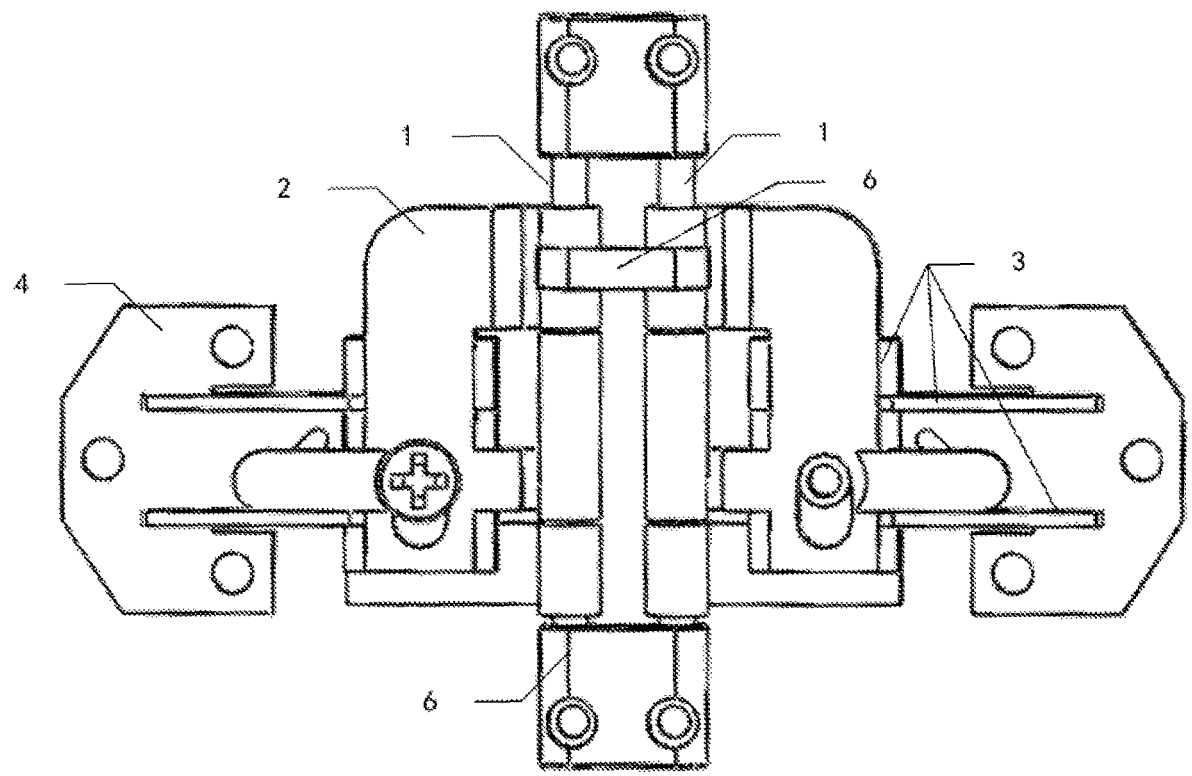
FIG. 4C illustrates a schematic bottom view of the rotating shaft in FIG. 3.

As shown in FIG. 2, the two screen-brackets 30 of the electronic device 100 are connected to the rotating shaft 10 and are symmetrical to each other. In FIG. 2, the electronic device 100 includes two rotating shafts 10, which are arranged symmetrically. In some embodiments, the electronic device 100 may include three or more rotating shafts 10. In some other embodiments, the electronic device 100 may only include one rotating shaft 10. The rotating shaft may be set according to actual needs. FIG. 3 to FIG. 4C illustrate an overall structure of the rotating shaft 10. FIG. 5 to FIG. 9 illustrate a schematic structural diagram of each part of the rotating shaft 10. FIG. 11A to FIG. 15 illustrate design key points of a track groove on a screen connection structure.

FIG. 3 illustrates a schematic perspective view of the rotating shaft 10 according to some embodiments of the present disclosure. FIG. 4A illustrates a schematic top view showing the rotating shaft 10 in FIG. 3. FIG. 4B illustrates a schematic C-C cross-sectional view showing the rotating shaft 10 in FIG. 4A. FIG. 4C illustrates a schematic bottom view showing the rotating shaft 10 in FIG. 3.

As shown in FIG. 3~FIG. 4C, the rotating shaft 10 includes two axle structures 101, which are arranged symmetrically. The axle structure 101 includes an axle 1, a motion conversion structure 2, a supporting bracket 3, and a screen bracket connection structure 4.

Figure 5:
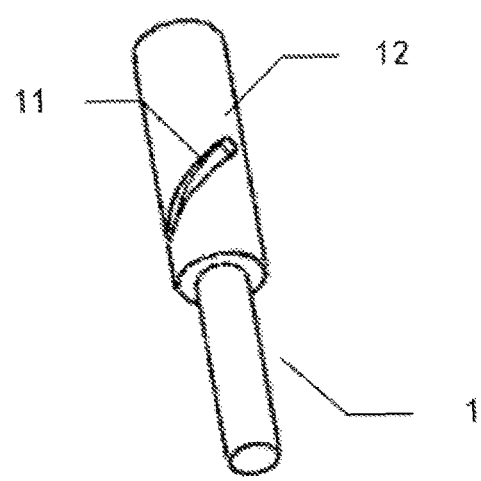
FIG. 5 illustrates a schematic perspective view of a rotating axle of the rotating shaft in FIG. 3.

As shown in FIG. 5, a surface of the axle includes a worm groove 11.

Figure 7A:
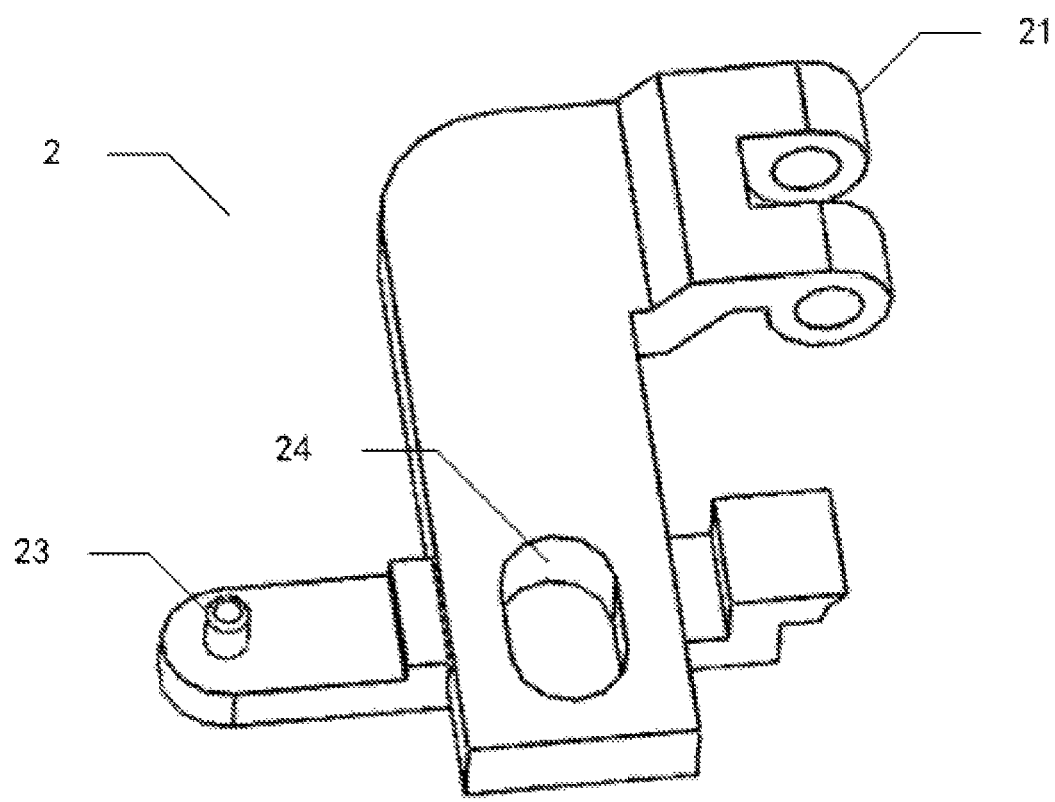
FIG. 7A and FIG. 7B illustrate schematic perspective views of a motion conversion structure of the rotating shaft in FIG. 3 with different fields of view.
Figure 7B:
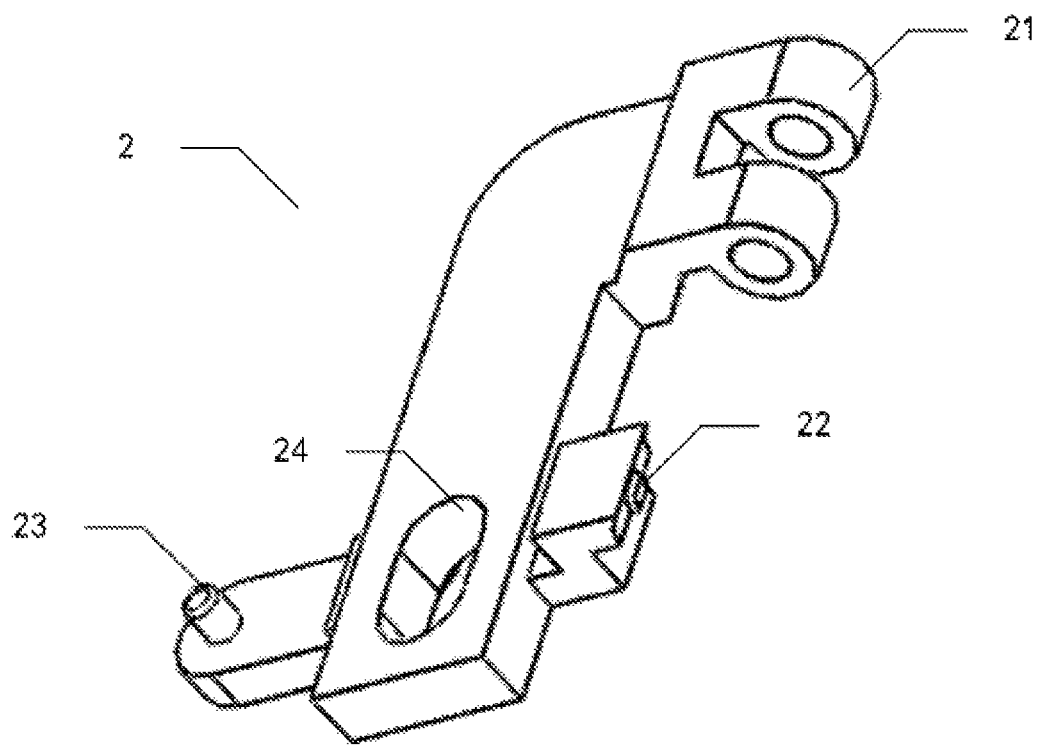

As shown in FIG. 7A and FIG. 7B, the motion conversion structure 2 may cooperate with the worm groove 11 to form a worm drive.

Figure 9:
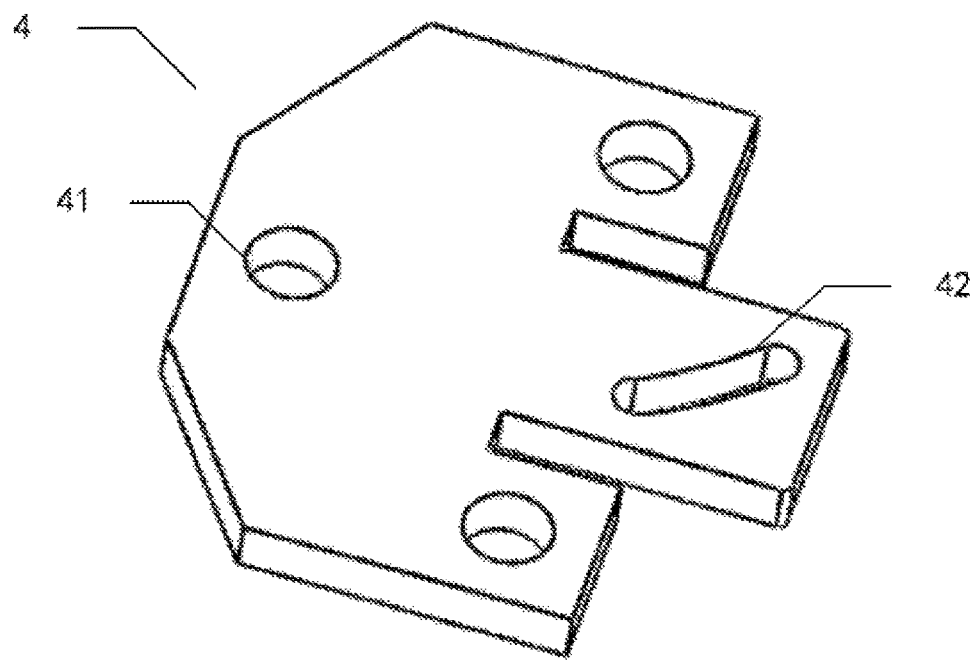
FIG. 9 illustrates a schematic perspective view of a screen bracket connection structure of the rotating shaft in FIG. 3.

As shown in FIG. 9, the screen bracket connection structure 4 may be configured to be moveably connected to the motion conversion structure 2. A mounting hole 41 for mounting the screen bracket 30 is located at the screen bracket connection structure 4.

Figure 8A:
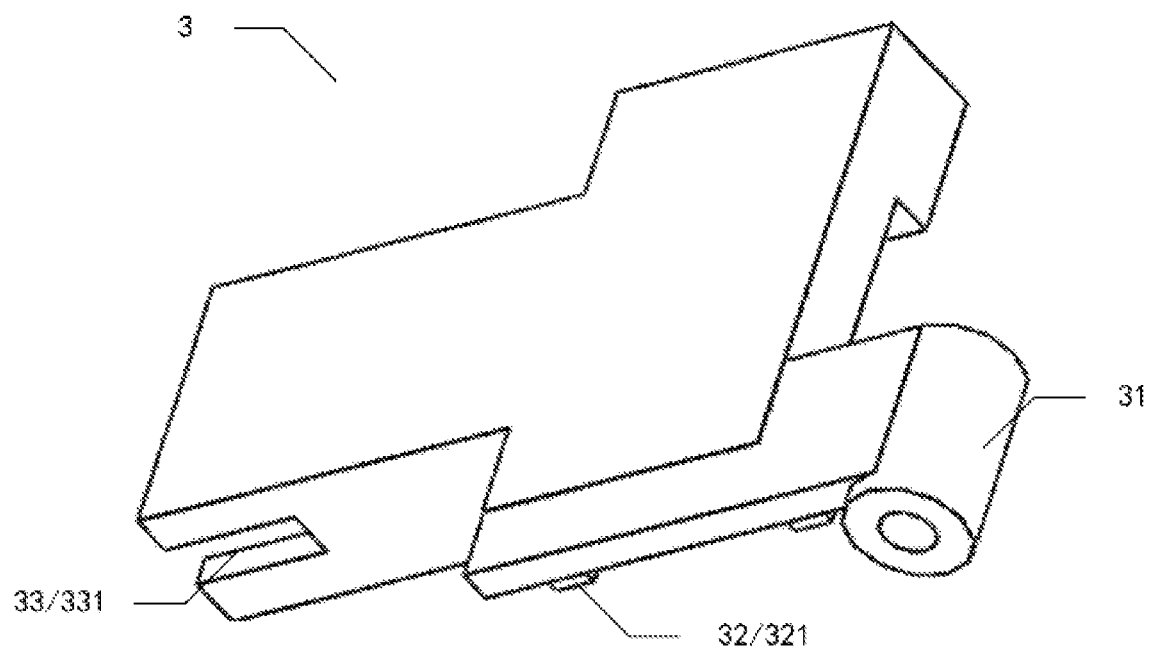
FIGS. 8A and 8B illustrate schematic perspective views of a supporting bracket of the rotating shaft in FIG. 3.
Figure 8B:
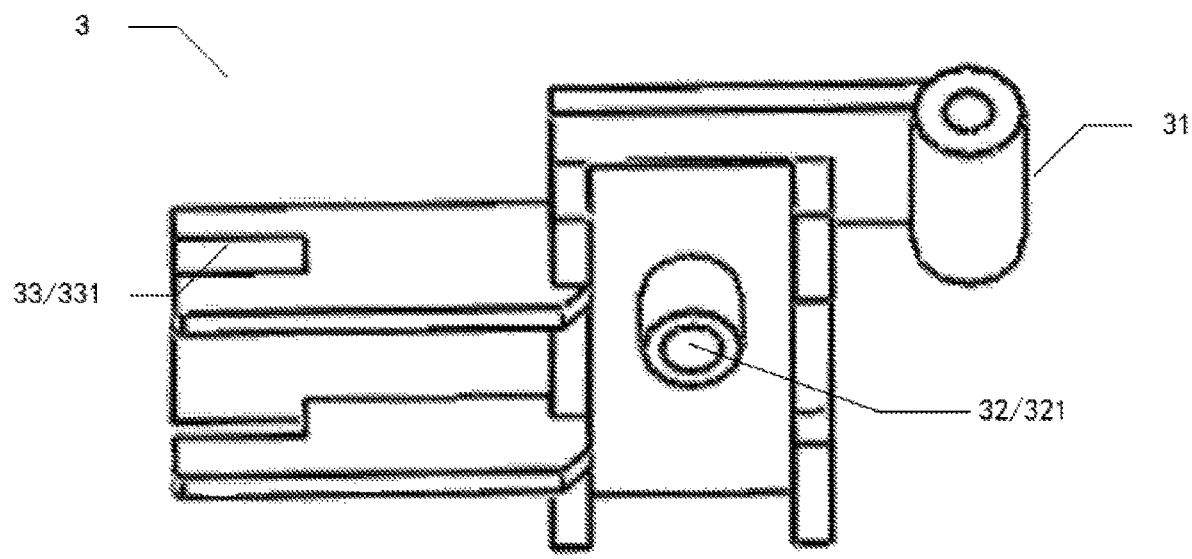

As shown in FIGS. 8A and 8B, the supporting bracket 3 is sleeved on the axle 1 and may rotate around an axis of the axle 1. The supporting bracket 3 may also be movably connected to the motion conversion structure 2 and screen bracket connection structure 4.

The movement conversion structure 2 may move relative to the supporting bracket 3 along the axis direction of the axle 1 on a first surface, and the screen bracket connection structure 4 may move relative to the supporting bracket 3 along a radial direction of the axle 1 on the first surface. The first surface is a surface where the supporting bracket 3 is located.

In the rotating shaft 10 of embodiments of the present disclosure, the axle 1 may be used as a reference to describe a movement of each part relative to the axle 1, which is described as follows.

The movement of the supporting bracket 3 relative to the axle 1 is relatively simple. The supporting bracket 3 may only rotate around the axis relative to the axle 1. The supporting bracket 3 may support the motion conversion structure 2 and the screen bracket connection structure 4. The motion conversion structure 2 and the screen bracket connection structure 4 may move relative to the supporting bracket 3 while rotating around the axle 1 with the supporting bracket 3, which is described as follows.

The motion conversion structure 2 and the worm groove at the surface of the axle 1 may form a worm drive. The motion conversion structure 2 may move along the axis direction of the axle 1 while rotating around the axle 1. That is, the motion conversion structure 2 may move relative to the supporting bracket 3 along the axis direction while rotating around the axle 1 with the supporting bracket 3.

On one respect, the screen bracket connection structure 4 may be supported by the supporting bracket 3 and may rotate around the axis of the axle 1. On another respect, the screen bracket connection structure 4 may be connected to the motion conversion structure 2 and may be pushed by the motion conversion structure 2 to generate translation on a surface where the supporting bracket 3 is located (i.e., the first surface). At the same time, the screen bracket connection structure 4 needs to be connected to the screen bracket 3, and the distance between opposite sides of the two screen-brackets 30 needs to be maintained at a fixed value when the two screen-brackets 30 rotate to any angle. To achieve the requirement, a relative motion trajectory of the motion conversion structure 2 and the screen bracket connection structure 4 may be designed, so that the screen bracket connection structure 4 may be driven by the motion conversion structure 2 to move along the radial direction of the axle 1.

For example, in some embodiments, the motion conversion structure 2 may be designed to move relative to the screen bracket connection structure 4 along a track groove 42 of the screen bracket connection structure 4. The design constraint condition of the trajectory of the track groove 42 may be that the distance between the opposite sides of the two screen-brackets 30 always may maintain a fixed value when the two screen-brackets 30 rotate to any angle. As such, the screen-brackets 30 connected to the screen bracket connection structure 4 may move along the radial direction of the axle 1 (toward the rotating shaft 10) while rotating during a folding process of the electronic device 100. Therefore, the flexible screen 20 located at the screen-brackets 30 may move toward the rotating shaft 10 while being folded when the electronic device 100 is folded. The two axles 1 of the rotating shaft 10 may be parallel to each other without contacting each other to reserve a space for a downward movement of the screen supporting bracket 30 and a bent portion of the flexible screen 20. As such, the flexible screen 20 may not be repeatedly stretched or compressed when the electronic device 100 is under different application states of unfolded or folded.

FIG. 5 illustrates a schematic perspective view of a rotating axle 1 of the rotating shaft in FIG. 3.

As shown in FIG. 5, the surface of the axle 1 includes a worm groove 11. Assume that pitch of the worm groove 11 may be A mm and a rotation amount of the axle 1 maybe 90 degrees (i.e., the electronic device 100 is folded 90° in half). Thus, an axial sliding amount of the worm drive formed by the axle 1 and the motion conversion structure 2 is A/4 mm.

In connection with FIG. 3, an end of the axle 1 may be fixed at a axle fixing structure 6, and the other end of the axle 1 may include a coaxial sleeve 12. The worm groove 11 may be arranged at a surface of the sleeve 12.

Figure 6:
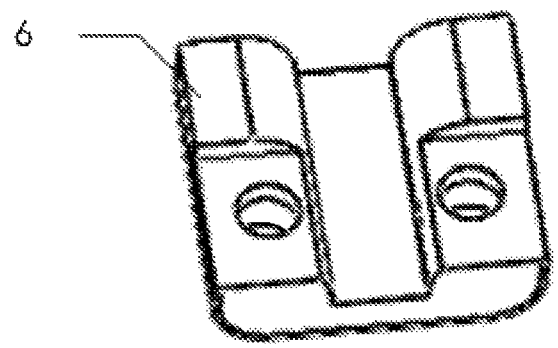
FIG. 6 illustrates a schematic perspective view of a axle fixing structure of the rotating shaft FIG. 3.

FIG. 6 illustrates a schematic perspective view showing the axle fixing structure 6 of the rotating shaft 10 FIG. 3.

As shown in FIG. 3 and FIG. 6, two parallel axles 1 may be mounted at the axle fixing structure. The axle fixing structure 6 may be configured to not only fix the axle 1, but also cover the inside structure of rotating shaft 10, so that the inside structure of the rotating shaft 10 which is mounted at the electronic device 100 may not be exposed. As such, an appearance of the electronic device 100 is aesthetic.

In some embodiments, after mounted at the axle fixing structure 6, the axle 1 may be fixed relative to the axle fixing structure 6.

FIG. 7A and FIG. 7B illustrate schematic perspective views showing the motion conversion structure 2 in the rotating shaft 10 in FIG. 3 with different fields of view.

As shown in FIGS. 3 to 4C, and FIGS. 7A to 7B, the motion conversion structure 2 includes a first protrusion 22. The first protrusion 22 (e.g., a pin) is embedded in the worm groove 11 to match the worm groove 11, such that the motion conversion structure 2 and the axle 1 form a worm drive.

The motion conversion structure 2 further includes a second protrusion 23. The second protrusion 23 is embedded in the track groove 42 of the screen bracket connection structure 4. The second protrusion 23 may move in the track groove 42 along the trajectory of the track groove 42. As such, the motion conversion structure 2 may be movably connected to the screen bracket connection structure 4.

The motion conversion structure 2 further includes a long circular hole 24. A long axis of the long circular hole 24 is parallel to the axis of the axle 1. The motion conversion structure 2 may be movably connected to the supporting bracket 3 along the axis of the axle 1 through the long circular hole 24.

The motion conversion structure 2 further includes a first sleeve 21. The first sleeve 21 is sleeved on the surface of the axle 1. The first sleeve 21 may rotate around the axle 1 and move along the axis of the axle 1. As such, the motion conversion structure 2 may be supported by the supporting bracket 3 to rotate relative to the axis of the axle 1 and may move along the axis of the axle 1 due to the worm drive.

FIGS. 8A and 8B illustrate schematic perspective views of the supporting bracket 3 of the rotating shaft 10 in FIG. 3.

As shown in FIGS. 3 to 4C and FIGS. 8A and 8B, the supporting bracket 3 includes a second sleeve 31, an axial movement connection structure 32, and a radial movement connection structure 33.

The second sleeve 31 is sleeved on the axle 1 and may rotate around the axis of the axle 1. The axial movement connection structure 31 may be movably connected to the movement conversion structure 2. The radial movement connection structure 33 may be movably connected to the screen bracket connection structure 4.

In some embodiments, the axial movement connection structure 32 includes a third protrusion 321. The third protrusion 321 may be embedded in the long circular hole 24, and the third protrusion 321 may move along the long axis of the long circular hole 24. As such, while the motion conversion structure 2 and the supporting bracket 3 rotate around the axle 1, the motion conversion structure 2 and the supporting bracket 3 may relatively translate along the axis direction of the axle 1.

In some embodiments, the radial movement connection structure 33 includes a radial sliding clamping structure 331. The radial sliding clamping structure 331 may be configured to slidingly clamp the screen bracket connection structure 4. A shape of the radial sliding clamping structure 331 may be similar to opening grooves on two protruding teeth of a plug. A panel of the screen bracket connection structure 4 may be clamped in the grooves, and the screen bracket connection structure 4 may slide in the groove.

FIG. 9 illustrates a schematic perspective view of the screen bracket connection structure 4 of the rotating shaft 10 in FIG. 3.

As shown in FIGS. 3 to 4C and FIG. 9, the screen bracket connection structure 4 includes a mounting hole 41 and a track groove 42.

The mounting hole 41 may be configured to mount the screen bracket 30. The screen bracket 30 is fixed to the screen bracket connection structure 4 after being mounted at the screen bracket connection structure 4 through the mounting hole 41.

The track groove 42 may be configured to embed the second protrusion 23 of the motion conversion structure 2 to cause the second protrusion 23 to move in the track groove 42 along the trajectory of the track groove 42. The trajectory of the track groove 42 may be determined according to the distance between the opposite sides of the two screen-brackets 30, which maintains a fixed value when the two screen-brackets 30 are at any angle.

Figure 10:
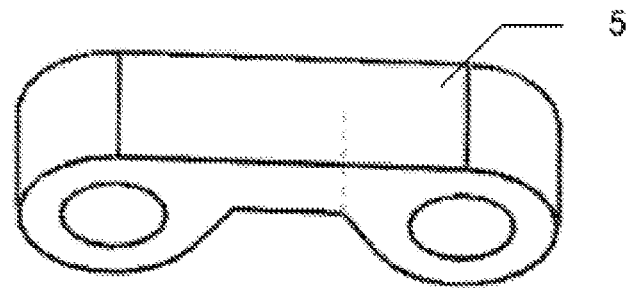
FIG. 10 illustrates a schematic perspective view of a synchronization structure of the rotating shaft shown in FIG. 3.

FIG. 10 illustrates a schematic perspective view of a synchronization structure of the rotating shaft 10 shown in FIG. 3.

As shown in FIGS. 3 to 4C and FIG. 10, the rotating shaft 10 also includes a synchronization structure 5. The synchronization structure 5 may be configured to connect the two axle structures 101 and synchronously mirror movements of the two axle structures 101.

According to the rotating shaft 10 of embodiments of the present disclosure, the rotation around the axle 1 may be converted into a movement along the axis direction of the axle 1 by the worm drive formed by the motion conversion structure 2 and the axle 1. Then, through the movement of the motion conversion structure 2 along the track groove 42 of the screen bracket connection structure 4, the screen bracket connection structure 4 may be driven to move relative to the radial direction of the axle 1. As such, the screen bracket fixedly connected to the screen bracket connection structure 4 may be driven to rotate around the axle 1 while moving relative to the radial direction of the axle 1.

According to the rotating shaft 10 of embodiments of the present disclosure, the configuration position of the track groove 42 of the screen bracket connection structure 4 may be freely selected at the screen bracket connection structure 4, which provides more flexibility and convenience for mounting the screen bracket 30 and the flexible screen 20.

Design key points of the track groove 42 are illustrated according to FIGS. 11A to 15.

Figure 11A:
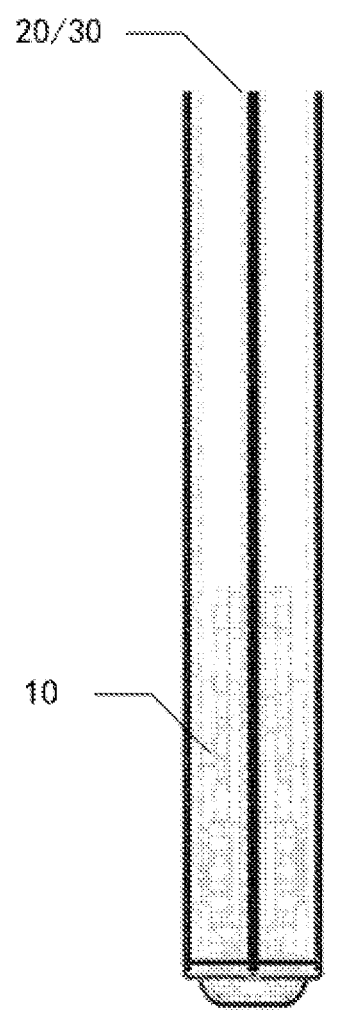
FIG. 11A illustrates a schematic state diagram of a part of the electronic device near the rotating shaft when the screen of the electronic device is in a folded state according to some embodiments of the present disclosure.
Figure 11B:
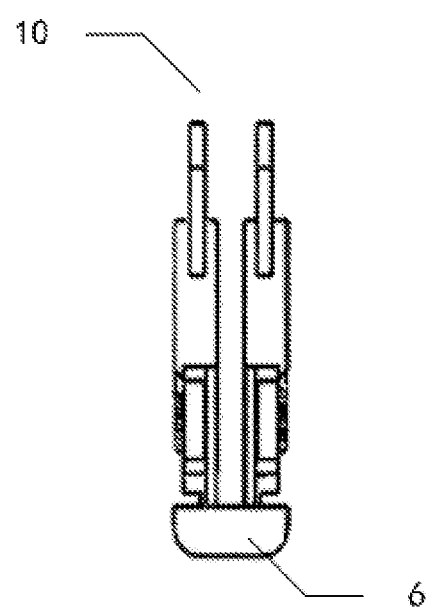
FIG. 11B illustrates a schematic state diagram of the rotating shaft when the screen of the electronic device in the folded state according to some embodiments of the present disclosure.

FIG. 11A illustrates a schematic state diagram of a part of the electronic device 100 near the rotating shaft 10 when the screen 20 of the electronic device 100 is in a folded state according to some embodiments of the present disclosure. FIG. 11B illustrates a schematic state diagram of the rotating shaft 10 when the screen 20 of the electronic device 100 in the folded state according to some embodiments of the present disclosure.

As shown in FIGS. 11A and 11B, when the screen 20 of the electronic device 100 is in a folded state, a zero-gap between the corresponding two screen-brackets 30 is realized. The dotted line in FIG. 11A illustrates the rotating shaft 10 which is mounted inside the electronic device 100. Only the axle fixing structure 6 is exposed.

Figure 12A:
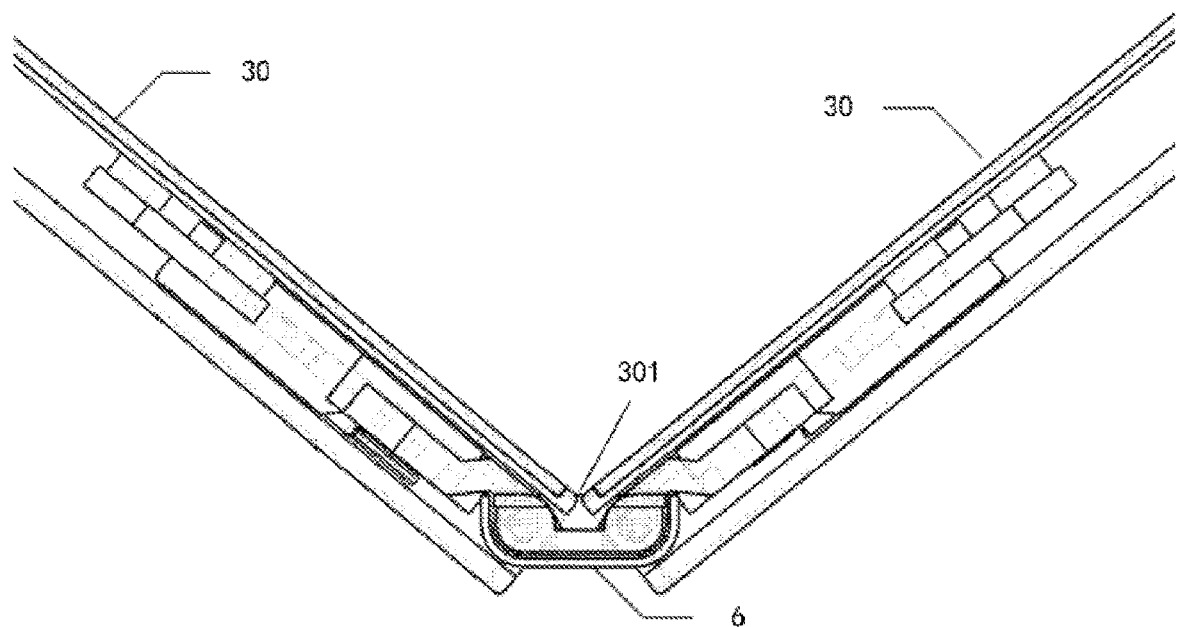
FIG. 12A illustrates a schematic state diagram of a part of the electronic device near the rotating shaft when the screen of the electronic device is in a partially unfolded state according to some embodiments of the present disclosure.
Figure 12B:
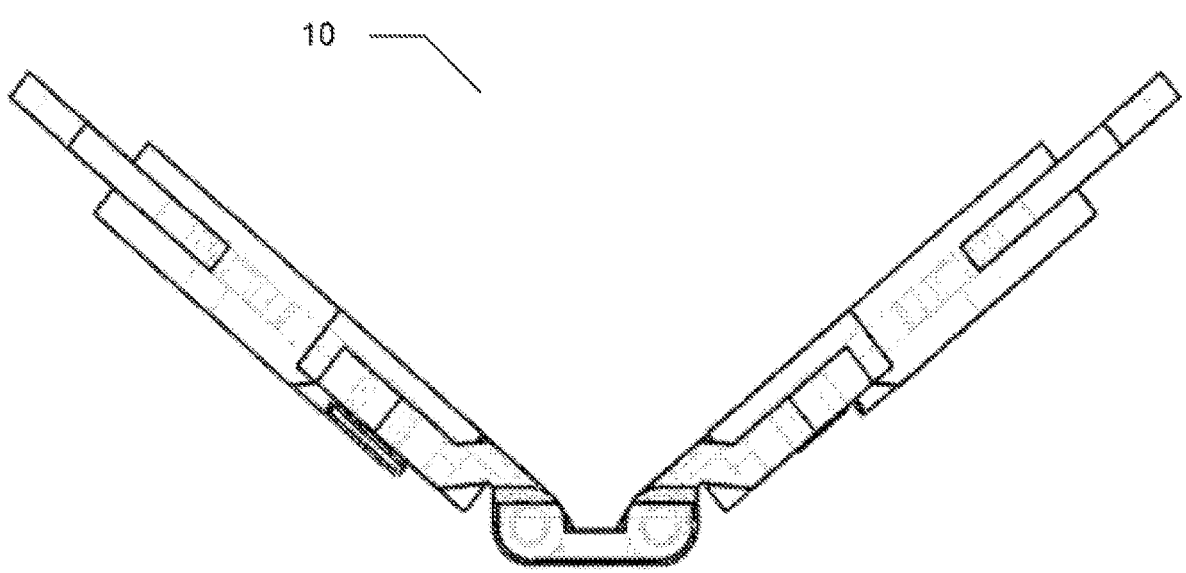
FIG. 12B illustrates a schematic state diagram of the rotating shaft when the screen of the electronic device is in the partially unfolded state according to some embodiments of the present disclosure.

FIG. 12A illustrates a schematic state diagram of a part of the electronic device 100 near the rotating shaft 10 when the screen 20 of the electronic device 100 is in a partially unfolded state according to some embodiments of the present disclosure. FIG. 12B illustrates a schematic state diagram of the rotating shaft 10 when the screen 20 of the electronic device 100 is in the partially unfolded state according to some embodiments of the present disclosure. FIG. 12A is a cross-sectional view of the area where the rotating shaft 10 of the electronic device 100 is located.

As shown in FIGS. 12A and 12B, the two screen-brackets 30 are at an angle larger than zero and smaller than 90 degrees. A narrow or zero-gap is maintained between the opposite sides 301 of the two screen-brackets 30. Compared to the state of FIG. 11A, the opposite sides 301 of the two screen-brackets 30 may move upward relative to the axle fixing structure 6.

In some embodiments, the distance between the opposite sides 301 of the two screens brackets 30 may maintain a fixed value (e.g., zero) when the two screen-brackets 30 rotate around the rotating shaft 10 to any angle.

Figure 13:
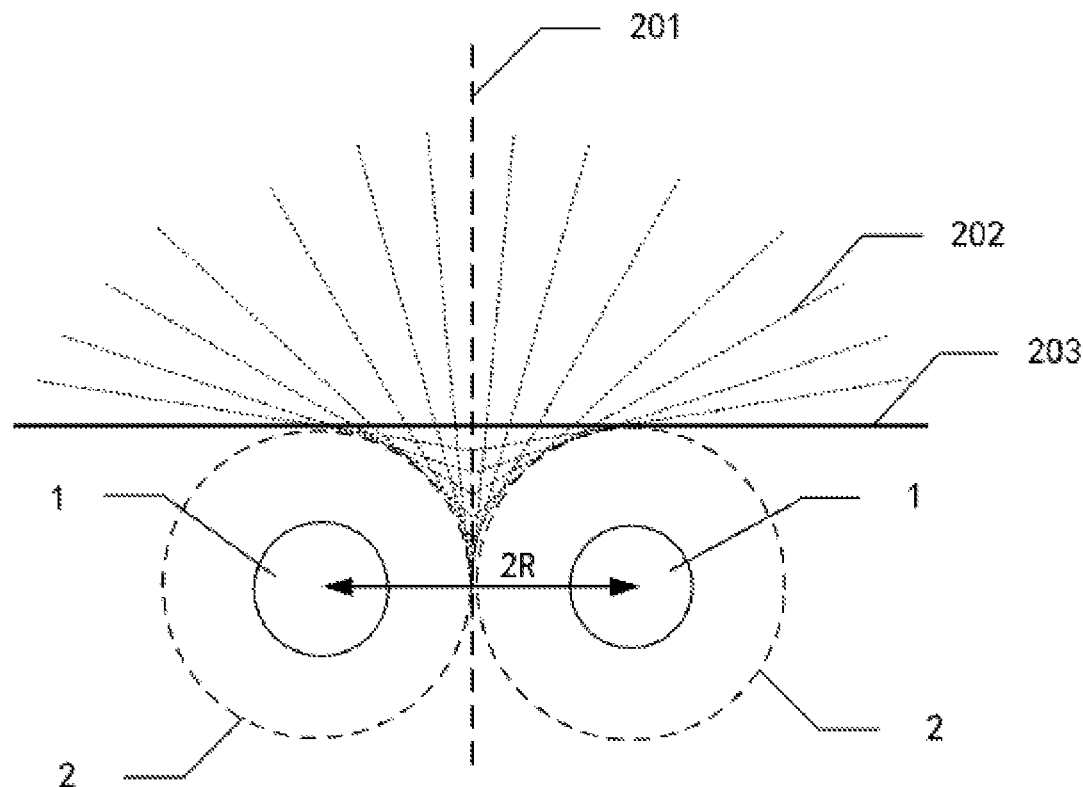
FIG. 13 illustrates a schematic position state diagram of the screen of the electronic device in different folding states according to some embodiments of the present disclosure.

FIG. 13 illustrates a schematic position state diagram of the screen 20 of the electronic device 100 in different folding states according to some embodiments of the present disclosure.

The dotted circle 2 in FIG. 13 is the surface of the rotation trajectory formed by a foldable part of the flexible screen 20 rotating around the axle 1.

When the electronic device 100 is in different states, the flexible screen 20 may be located within dotted lines 201 and 203, or any dotted line (e.g., dotted line 202) between dotted line 201 and 203 in FIG. 13. As such, during a position change process from the dotted line 201 to the dotted line 203, a centerline of the flexible screen 20 may rise accordingly. That is, the two foldable portions of the flexible screen 20 not only rotate around the axle 1 but also translate.

Figure 14A:
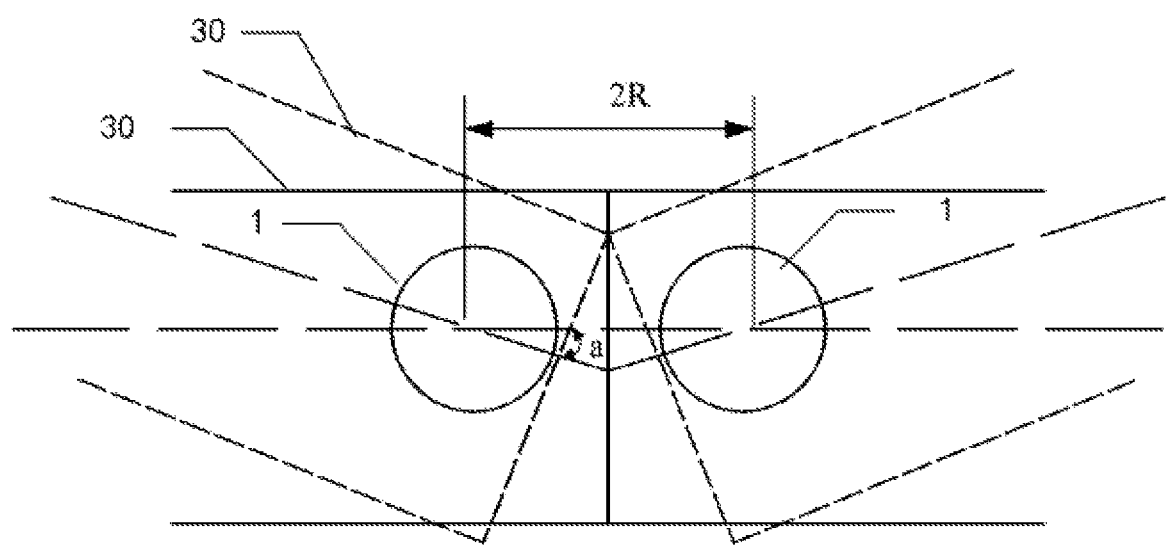
FIG. 14A and FIG. 14B illustrate a schematic calculation process of a radial component along the axle in a trajectory of a track groove in the screen bracket connection structure according to some embodiments of the present disclosure.
Figure 14B:
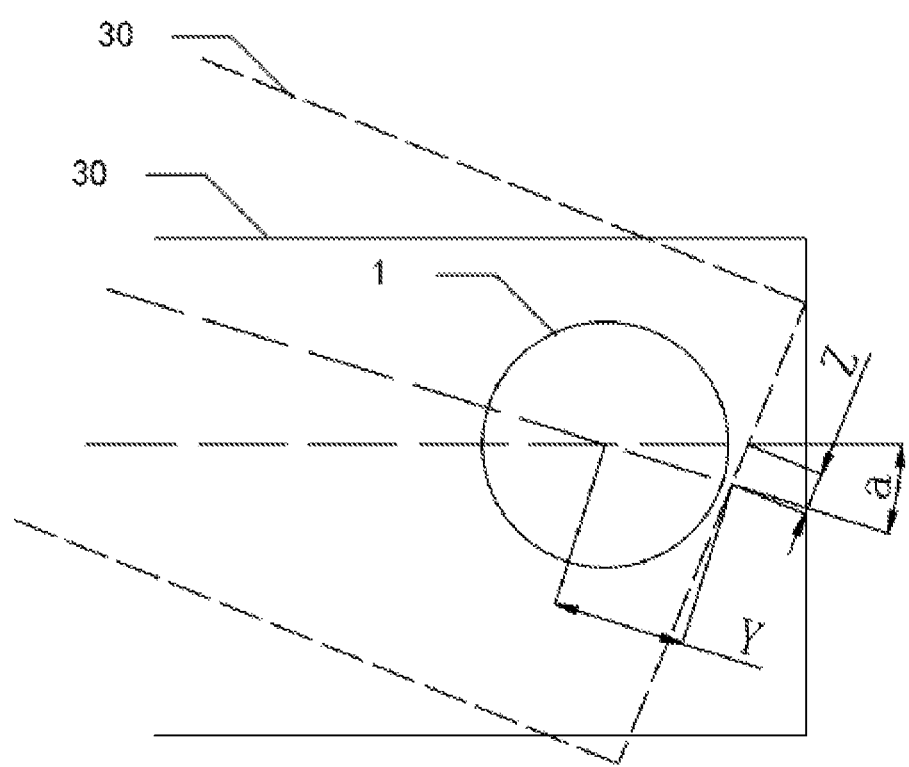

FIG. 14A and FIG. 14B illustrate a schematic calculation process of a radial component along the axle 1 in the trajectory of the track groove 42 in the screen bracket connection structure 4 according to some embodiments of the present disclosure.

Figure 15:
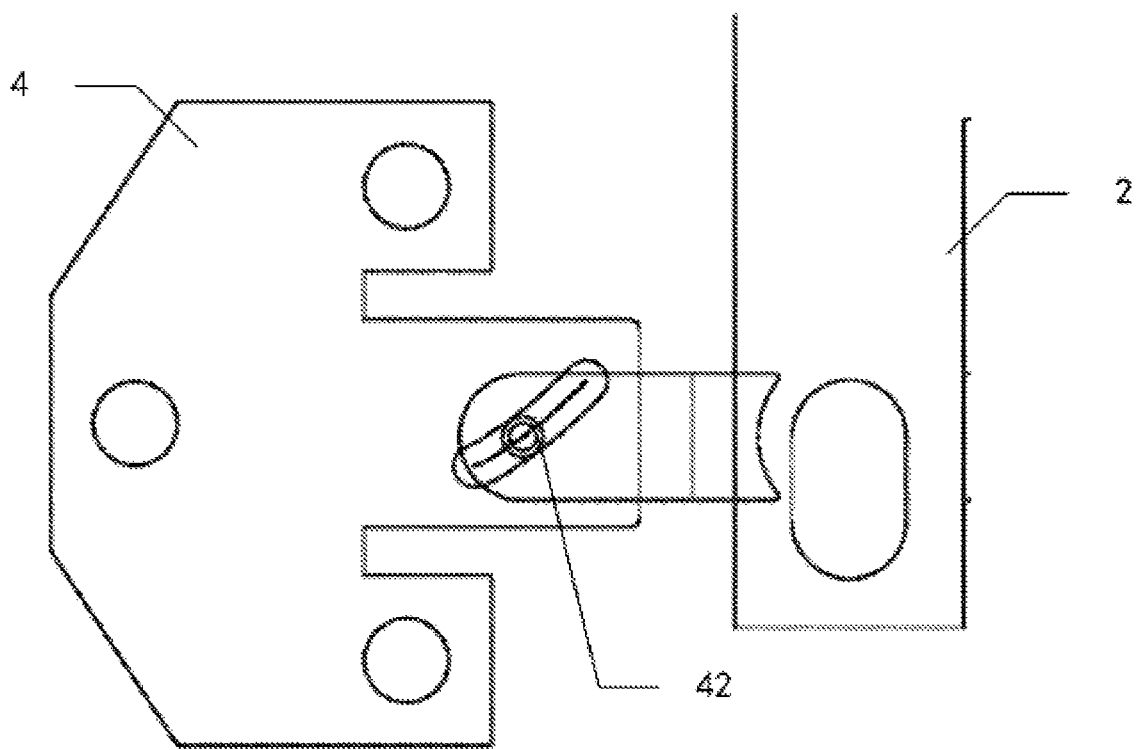
FIG. 15 illustrates a schematic diagram of a relative movement of the motion conversion structure and the screen bracket connection structure of the rotating shaft in FIG. 3 along the track groove.

FIG. 15 illustrates a schematic diagram of a relative movement of the motion conversion structure 2 and the screen bracket connection structure 4 of the rotating shaft 10 in FIG. 3 along the track groove 42.

The trajectory of the track groove 42 may represent a trajectory of the related movement between the motion conversion structure 2 and the screen bracket connection structure 4. The trajectory may be composed of an axial translation component X of the motion conversion structure 2 along the axle 1, and a radial translation component Y of the screen bracket connection structure 4 along the axle 1.

FIGS. 14A and 14B illustrate the electronic device 100 from the unfolded state to the rotation angle a.

Assume that the distance between the two axles 1 of the rotating shaft 10 may be 2R. R may be a radius of the rotation trajectory formed by the flexible screen 20 rotating around the axle 1. When the two screen-brackets 30 are set to rotate to the angle a, as shown in FIGS. 14A and 14B:

$$\because Z/\sin(a)+Z=R, \therefore Z=R/(1/(\sin a)+1)$$

$$\because Z=(\tan a)\times Y, \therefore Y=R/((1/(\sin a)+1)\times(\tan a)).$$

Further, when the pitch of the worm groove 11 in FIG. 5 is A mm and the rotation of the axle is 90 degrees (i.e., the electronic device 100 is folded at 90 degrees), the axial sliding amount caused by the worm drive is A/4 mm. When the two screen-brackets 30 rotate to an arbitrary angle a, the axial translation amount of the motion conversion structure 2 caused by the worm drive may be set to X:

where $X=(a/360)\times A$;

and a trajectory equation of the track groove 42 is obtained:

$$Y=R/(1/(\sin(360\times X/A)+1)\times(1/(\tan(360\times X/A)))) \quad (1)$$

In some embodiments, when R is 2.65, a coordinate value of each point in the trajectory of the track groove 42 in Table 1 when the two screen-brackets 30 rotate to the arbitrary angle a may be obtained. According to Table 1, the trajectory may be obtained by drawing points. For example, the trajectory of the groove 42 is shown in FIG. 15.

TABLE 1

| Angle(a) | Y | X |
|---|---|---|
| 0 | 2.65 | 0 |
| 9 | 2.22 | 0.2 |
| 18 | 1.93 | 0.4 |
| 27 | 1.62 | 0.6 |
| 36 | 1.35 | 0.8 |
| 45 | 1.1 | 1 |
| 54 | 0.86 | 1.2 |
| 63 | 0.64 | 1.4 |
| 72 | 0.42 | 1.6 |
| 81 | 0.21 | 1.8 |
| 90 | 0 | 2 |

According to embodiments of the present disclosure, the relative movement of the motion conversion structure 2 and the screen bracket connection structure 4 may be restricted by the track groove 42, so that the motion conversion structure 2 is translated along the axis of the axle 1 to drive the screen bracket connection structure 4 to translate along the radial direction of the axle 1. The screen bracket 30 connected to the screen bracket connection structure 4 may be caused to move along the radial direction of the axle 1 (the direction toward the rotating shaft 10) while rotating when the electronic device 100 is being folded. As such, the flexible screen 20 at the screen bracket 30 may move toward the rotating shaft 10 while the electronic device is being folded.

Those skilled in the art may understand that various embodiments of the present disclosure and/or the features described in the claims may be grouped and/or combined in various ways, even if such groups or combinations are not explicitly described in the present disclosure. In particular, without departing from the spirit and teaching of the present disclosure, various embodiments of the present disclosure and/or the features described in the claims may be grouped and/or combined in various ways. All these groups and/or combinations are within the scope of the present disclosure.

Although the present disclosure is described by exemplary embodiments of the present disclosure. Those of skill in the art should understand that various changes in form and details may be made to the present disclosure without departing from the spirit and scope of the present disclosure defined by the claims and their equivalents. Therefore, the scope of the present disclosure should not be limited to the above embodiments but determined not only by the appended claims but also by their equivalents.

What is claimed is:

1. A rotating shaft configured to connect two screen-brackets, comprising:
    two axle structures arranged symmetrically, one of the two axle structures including:
        an axle including a worm groove at a surface of the axle;
        a motion conversion structure cooperating with the worm groove to form a worm drive;
        a screen bracket connection structure movably connected to the motion conversion structure and including mounting holes being configured to mount the two screen-brackets; and
        a supporting bracket sleeved at the axle, rotating around an axis of the axle, and movably connected to the motion conversion structure and the screen bracket connection structure;
    wherein:
        the motion conversion structure is movable along an axis direction of the axle on a first surface relative to the supporting bracket;
        the screen bracket connection structure is movable along a radial direction of the axle on the first surface relative to the supporting bracket;
        the first surface is a surface where the supporting bracket is located;
        the screen bracket connection structure includes a track groove; and
        the motion conversion structure includes a first protrusion embedded in the worm groove and cooperating with the worm groove to form the worm drive, and a second protrusion embedded in the track groove and moving along a trajectory of the track groove in the track groove.

2. The rotating shaft of claim 1, wherein the trajectory of the track groove is configured to allow a distance between opposite sides of the two screen-brackets to be maintained at a fixed value when the two screen-brackets rotate.

3. The rotating shaft of claim 1, wherein the supporting bracket includes:
    a second sleeve sleeved at the axle and rotating around the axis of the axle;
    a radial movement connection structure movably connected to the motion conversion structure; and
    an axial movement connection structure movably connected to the screen bracket connection structure.

4. The rotating shaft of claim 3, wherein:
    the radial movement connection structure includes a third protrusion;
    the motion conversion structure includes a hole; and
    the third protrusion is embedded in the hole.

5. The rotating shaft of claim 3, wherein:
    the radial movement connection structure includes a radial sliding clamp structure; and the radial sliding clamp structure is configured to clamp the screen bracket connection structure.

6. The rotating shaft of claim 1, further comprising a synchronization structure configured to connect the two axle structures and synchronously mirror movements of the two axle structures.

7. An electronic device, comprising:
two screen-brackets; and
a rotating shaft configured to connect the two screen-brackets, the rotating shaft including:
two axle structures arranged symmetrically, one of the two axle structures including:
an axle including a worm groove at a surface of the axle;
a motion conversion structure cooperating with the worm groove to form a worm drive;
a screen bracket connection structure movably connected to the motion conversion structure and including mounting holes being configured to mount the two screen-brackets; and
a supporting bracket sleeved at the axle, rotating around an axis of the axle, and movably connected to the motion conversion structure and the screen bracket connection structure;
wherein:
the motion conversion structure is movable along an axis direction of the axle on a first surface relative to the supporting bracket;
the screen bracket connection structure is movable along a radial direction of the axle on the first surface relative to the supporting bracket;
the first surface is a surface where the supporting bracket is located;
the screen bracket connection structure includes a track groove; and
the motion conversion structure includes a first protrusion embedded in the worm groove and cooperating with the worm groove to form the worm drive, and a second protrusion embedded in the track groove and moving along a trajectory of the track groove in the track groove.

8. The device of claim 7, wherein:
a distance between opposite sides of the two screen-brackets is maintained at a fixed value when the two screen-brackets rotate around the axis to an arbitrary angle.

9. The device of claim 7, further comprising:
a flexible screen mounted at the two screen-brackets.

10. The device of claim 7, wherein the supporting bracket includes:
a second sleeve sleeved at the axle and rotating around the axis of the axle;
a radial movement connection structure movably connected to the motion conversion structure; and
an axial movement connection structure movably connected to the screen bracket connection structure.

11. The device of claim 10, wherein:
the radial movement connection structure includes a third protrusion;
the motion conversion structure includes a hole; and
the third protrusion is embedded in the hole.

12. The device of claim 10, wherein:
the radial movement connection structure includes a radial sliding clamp structure; and
the radial sliding clamp structure is configured to clamp the screen bracket connection structure.

13. The device of claim 7, wherein the rotating shaft further includes a synchronization structure configured to connect the two axle structures and synchronously mirror movements of the two axle structures.

* * * * *